United States Patent [19]

Burk

[11] Patent Number: 4,612,492

[45] Date of Patent: Sep. 16, 1986

[54] CONSTANT VOLTAGE POWER CIRCUIT FOR A REMOTELY CONTROLLED DEVICE

[76] Inventor: Leslie L. Burk, 8413 NW. 92, Oklahoma City, Okla. 73132

[21] Appl. No.: 686,326

[22] Filed: Dec. 24, 1984

[51] Int. Cl.⁴ ............................................. H02J 7/00
[52] U.S. Cl. ......................................... 320/3; 307/19; 307/155; 320/6
[58] Field of Search ...................................... 320/2–5, 320/15, 21, 6; 307/19, 48, 55

[56] References Cited

U.S. PATENT DOCUMENTS

| | | | |
|---|---|---|---|
| 3,059,185 | 10/1962 | Krugman | 320/3 X |
| 3,614,581 | 10/1971 | Frost | 320/21 X |
| 4,207,511 | 6/1980 | Radtke | 320/6 |

Primary Examiner—Robert J. Hickey
Attorney, Agent, or Firm—Robert K. Rhea

[57] ABSTRACT

A circuit providing a constant voltage power source for a remotely controlled electrically operated device. The circuit includes a main battery operatively connected with a motor. The secondary battery is connected in parallel with the main battery and operatively connected with a wireless receiver. The negative terminals of both batteries are connected with the receiver through a double-pole single-throw switch and a series connected diode and inductor are interposed between the positive terminals of the batteries so that the secondary battery is charged by the potential of the main battery each time the switch is closed and current flow from the secondary battery to the main battery is prevented by the reverse bias of the diode.

5 Claims, 1 Drawing Figure

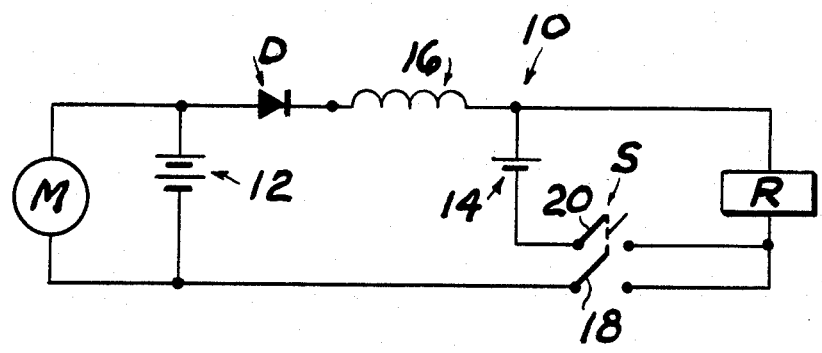

CONSTANT VOLTAGE POWER CIRCUIT FOR A REMOTELY CONTROLLED DEVICE

BACKGROUND OF THE INVENTION

1. Field of the invention

The present invention relates to remotely controlled devices and more particularly to a circuit providing a constant voltage power source for certain components thereof.

Remotely controlled devices, such as model aircraft, utilize a motor driven by onboard electrical potential and also include a radio receiver for selectively operating the controls at the will of the operator. It is imperative that the receiver be supplied with an electrical source of energy of preferably constant voltage and sufficient potential to prevent interruption or a cessation of control signals. Such source of voltage preferably being independent of the electrical source operating the prime mover. 2. Description of the prior art The most pertinent prior patent is believed to be U.S. Pat. No. 4,207,511 which discloses a circuit supplying a constant voltage for vehicle electronic controls from a secondary battery connected in parallel with the primary battery and vehicle charging circuit which supplies electrical energy to the vehicle motor for starting and operating the latter. The secondary battery is maintained charged by the vehicle charging system and/or the main battery when the vehicle motor starting switch is closed.

The circuit of this invention is distinctive over the circuit of the above named patent by utilizing an inductor connected in series with a secondary battery isolating diode supplying battery charging potential to the secondary battery.

SUMMARY OF THE INVENTION

In a wireless remotely controlled device a primary battery is connected in series with a primary motor. A secondary battery is connected in series with a receiver through one pole of a double-pole single-throw switch and in parallel with the primary battery through the other pole of the switch. A series connected diode and inductor connects the positive terminals of the battery with each other. Closing the switch charges the secondary battery from the potential of the main battery and applies the potential of both batteries to the receiver with the secondary battery being prevented from discharging to the primary battery by the reverse bias of the diode.

The principal object of this invention is to provide a circuit interconnecting a primary and a secondary battery for supplying constant voltage to the electronic components of a remotely controlled device in which the primary battery operates a primary motor and which permits the primary battery to be periodically recharged from a source of electrical charging current without overcharging or damaging the secondary batteries.

BRIEF DESCRIPTION OF THE DRAWINGS

The single FIGURE is a wiring diagram.

DESCRIPTION OF THE PREFERRED EMBODIMENTS

Like characters of reference designate like parts in those figures of the drawings in which they occur.

In the drawings:

The reference numeral 10 indicates a circuit for supplying a constant voltage source. The circuit 10 includes a preferably at least partially rechargeable main or primary battery 12 having its positive and negative terminals connected with a primary motor M. A secondary battery 14 is connected in parallel with the main battery 12. The secondary battery is preferably a sealed, at least partially rechargeable battery, such as Ni-Cd or alkaline $MnO_2$-Zn, of substantially smaller current capability than the main battery. Voltage drop means, such as a diode D, resistor, not shown, or inductor 16 are connected in series between the positive terminals of the batteries 12 and 14. The negative terminals of the batteries are respectively connected with the poles 18 and 20 of a double-pole single-throw switch S.

A wireless receiver R has one terminal connected with the positive terminal of the secondary battery 14 and the positive terminal of the primary battery 12 through the diode and the inductor. The other terminal of the receiver is connected to both terminals of the switch S.

Operation

In operation, closing switch S energizes the receiver R and connects the potential of the main battery 12 to the secondary battery 14 thus charging the secondary battery each time the receiver is energized. In the event of low potential in the main battery 12, the secondary battery 14 maintains full potential required for the operation of the receiver. The reverse bias of the diode D prevents discharge of the secondary battery potential to the main battery. When the circuit is connected with a charging circuit, not shown, the switch S is opened to isolate the secondary battery from the main battery and charging circuit thus allowing the main battery to be recharged without overcharging and damaging the small secondary battery 14.

Obviously the invention is susceptible to changes or alterations without defeating its practicability. Therefore, I do not wish to be confined to the preferred embodiment shown in the drawings and described herein.

I claim:

1. A circuit providing a constant voltage power source for a remotely controlled electrically operated device, comprising:
    a main battery;
    a primary motor operatively connected with said main battery;
    a secondary battery connected in parallel with said main battery,
        said secondary battery being a sealed at least partially rechargeable battery having a current capability substantially smaller than the main battery;
    a wireless receiver connected with the positive terminals of said batteries;
    a double-pole single-throw switch having its respective poles interposed between the respective negative terminals of said batteries and said receiver for simultaneously energizing the receiver and applying charging potential, when closed, from the main battery to the secondary battery; and,
    discharge preventing means interposed between the positive terminals of said batteries for preventing discharge of said secondary battery to said main battery.

2. The circuit according to claim 1 in which the main battery is a sealed rechargeable battery.

3. The circuit according to claim 2 in which said discharge preventing means includes:
   a diode.

4. The circuit according to claim 3 and further including:
   an inductor connected in series between the diode and the secondary battery.

5. The circuit according to claim 1 in which the discharge preventing means includes:
   a diode and an inductor connected in series between the positive terminals of said batteries.

* * * * *